United States Patent [19]

Tscheplak

[11] 4,452,349
[45] Jun. 5, 1984

[54] CLUTCH WEAR MEASUREMENT DEVICE

[75] Inventor: Ernst Tscheplak, Weinstadt, Fed. Rep. of Germany

[73] Assignee: Daimler-Benz Aktiengesellschaft, Fed. Rep. of Germany

[21] Appl. No.: 322,208

[22] Filed: Nov. 17, 1981

[30] Foreign Application Priority Data

Nov. 27, 1980 [DE] Fed. Rep. of Germany ....... 3044746

[51] Int. Cl.³ .................... F16D 2300; F16D 66/02
[52] U.S. Cl. ............................ 192/30 W; 188/1.11;
33/180 AT; 33/181 AT; 33/169 B; 33/174 E;
33/490
[58] Field of Search .................. 192/30 W; 188/1.11;
33/180 AT, 181 AT, 169 B, 174 E, 490; 73/7;
116/208

[56] References Cited

U.S. PATENT DOCUMENTS

| 1,935,678 | 11/1933 | Valpey | 33/181 AT X |
|---|---|---|---|
| 3,298,466 | 1/1967 | Ayers, Jr. et al. | 188/1.11 |
| 3,450,234 | 6/1969 | Takaka | |
| 3,533,491 | 10/1970 | Svenson | 188/1.11 |
| 3,946,845 | 3/1976 | Kamio | 192/30 W X |

FOREIGN PATENT DOCUMENTS

| 2118875 | 10/1972 | Fed. Rep. of Germany . | |
| 7729939 | 9/1977 | Fed. Rep. of Germany . | |
| 2734786 | 2/1979 | Fed. Rep. of Germany | 188/1.11 |
| 2705179 | 9/1980 | Fed. Rep. of Germany . | |
| 2,404,150 | 5/1979 | France | 188/1.11 |
| 1169479 | 11/1969 | United Kingdom . | |
| 2005838 | 4/1979 | United Kingdom | 33/180 AT |

Primary Examiner—Rodney H. Bonck
Assistant Examiner—David D. House
Attorney, Agent, or Firm—Craig & Burns

[57] ABSTRACT

A device for measuring wear of linings of a clutch, especially a motor vehicle clutch, with the clutch including a clutch-actuating device which has a push rod displaceable as a function of a position of, for example, a clutch pedal. A push rod includes a larger diameter portion which can be measured in a vicinity of a measurement point by means of a gauge, whereby the push rod acts upon a throwout fork which is adapted to be displaced as lining wear increases from a basic position in a direction of the push rod and indicate a need for replacement as a result of a predetermined change in diameter indicated by the group. The increased diameter portion of the push rod is formed by a frustoconical sleeve displaceable on the push rod. The sleeve is displaceable by a stop provided on a portion of a housing of the clutch when the clutch is thrown out for the first time into a fixed position corresponding to a maximum lining thickness. The sleeve is then disposed in a vicinity of the measuring point when the clutch is engaged.

9 Claims, 2 Drawing Figures

CLUTCH WEAR MEASUREMENT DEVICE

The present invention relates to a measuring device and, more particularly, to a device for enabling an indirect wear measurement of clutch linings of, for example, a motor vehicle clutch, with the clutch comprising a clutch-actuating device which includes a push rod, displaceable as a function of a position of, for example, a clutch pedal, and with the clutch rod having a rod section of larger diameter adapted to be gauged or measured in a vicinity of a measuring point by a gauge. The push rod acts on a throwout fork, with the end of the throwout fork at the push rod end being displaced in the direction of the push rod when the clutch is engaged as the lining wear increases thereby indicating a need for replacement of the clutch by a predetermined change in a diameter of the rod section as determined by the gauge.

A device of the aforementioned type has been proposed wherein a cylindrical larger diameter rod section is integrally connected with the push rod and is disposed between a measurement point and the throwout fork. As the cluth lining wears, the push rod is displaced by the throwout fork in a direction of the measurement point until the cylindrical rod section is in a vicinity of the measurement point when there is no longer a sufficient clutch lining for the clutch to properly function.

A disadvantage of the above noted proposed construction resides in the fact that it can merely be determined whether the clutch can still be used or is already worn-out and nothing can be determined about a degree of wear or the status of the clutch lining at any given point and time.

A further disadvantage of the above noted proposed construction resides in the fact that the measurement or determination of the clutch lining wear is very inaccurate since the relatively large tolerances required for manufacturing an assembly of the clutch determine the installation position of the throwout fork and also the push rod. Thus, it is possible for situations to arise wherein a clutch wear measurement indicates that the clutch should be dismantled for repair either too early or too late.

In, for example, German Utility Model No. 77 29 939, a brake lining arrangement for measuring wear and determining a wear status of the brake linings is proposed, wherein a test pin is displaceably mounted in a bore in the brake housing and tapers to a pointed comb, with a degree to which the test pin can be inserted being measured.

A disadvantage of the above noted brake lining wear measurement arrangement resides in the fact that the test pin is always located on a pressure disc so that a tip of the test pin or one edge of the pressure disc can easily dig into the material of the opposite part, resulting not only in a measuring error but also damage to the components being measured.

A further specially disadvantageous feature of the above noted brake lining measurement arrangement resides in the fact that, as a result of different assembly tolerances of the brake assembly before a first operation thereof, a zero or starting position of the brake assembly must first be determined by marking the test pin so that each test pin can only be used once.

The aim underlying the present invention essentially resides in providing a device for determining wear of a clutch lining of a clutch, which device enables a determination of a wear of the clutch lining independently of tolerances relating to, for example, manufacturing and/or assembly of the clutch.

In accordance with the present invention, a device for determining wear of clutch linings of the clutch of, for example, a motor vehicle, includes a clutch adjusting push rod having a large diameter push rod section formed by a frustoconical sleeve displaceable on the push rod, with the sleeve being displaceable into a zero or starting position corresponding to a maximum thickness of the linings of the clutch, a clutch having no lining wear, by a stop secured to or formed integrally with a clutch housing when the clutch is first disengaged, so that the sleeve is then in a vicinity of a measurement point when the clutch is engaged.

By virtue of the above noted features of the present invention, it is insured that the sleeve, after an initial actuation of the clutch actuating mechanism by, for example, a clutch pedal, will always be in the same initial position in a vicinity of the measuring point independently of the manufacturing and assembly tolerances for the clutch, with the initial position being dependent upon a length of the sleeve, a distance from a measuring point to the fixed stop, and a throwout distance of the clutch.

By assigning a certain sleeve diameter to the initial or starting position as the zero position for the clutch without lining wear, since a diameter of the sleeve in a vicinity of the measuring point changes with increasing wear, any deviation from the zero position may be determined with a gauge as a function of lining wear. Thus, an exact determination regarding a current status of the clutch lining can be ascertained and, in this manner, by contrast with previously proposed devices, an exact time for disassembling a clutch can readily be determined.

The sleeve of the clutch measuring device has a sufficient length so that, depending upon a distance between the measuring point and the stop and the throwout distance of the clutch, both in its original position and in a worn position, the sleeve is located in a vicinity of the measuring point.

The sleeve of the present invention may be in the form of a frustoconical sleeve cooperable with a gauge having suitable indicia thereon to accurately indicate the status of the clutch linings at any given time.

In accordance with further features of the present invention, the rod section of the push rod may be formed by providing the push rod with a stepped outer diameter, with a gauge then being employed to measure the respective diameters of the rod section.

Advantageously, a recess or opening is provided at the measuring point for enabling the gauge to be inserted into the clutch for measuring the rod section. The recess or opening may be provided in the housing of the clutch or be formed between a clutch actuating cylinder arrangement and an outer wall of the clutch housing by a flange means of the cylinder arrangement.

It is also possible in accordance with the present invention to provide an electrical means for sensing or determining, for example, a position of the larger diameter rod section formed by the sleeve or stepped configuration of a push rod, with the electrical means providing an appropriate output signal reflecting the wear of the clutch linings.

Accordingly, it is an object of the present to provide a clutch lining wear measuring device which avoids, by simple means, shortcomings and disadvantages encountered in the prior art.

Another object of the present invention resides in providing a clutch lining wear measuring device, especially for a motor vehicle clutch, which is simple in construction and therefore relatively inexpensive to manufacture.

Yet another object of the present invention resides in providing a clutch lining wear measuring device which enables an accurate determination of a status of the linings of the clutch at any given point and time.

A further object of the present invention resides in providing a clutch lining wear measuring device which enables a determination of a status of the clutch linings independently of manufacturing tolerances and/or assembly of the clutch.

A still further object of the present invention resides in providing a clutch lining wear measuring device which enables a measuring of the clutch lining without causing a premature wearing and/or damaging of components of the clutch.

These and other objects, features, and advantages of the present invention become more apparent from the following description when taken in connection with the accompanying drawings which show, for the purposes of illustration only, one embodiment in accordance with the present invention, and wherein.

Figure 1:
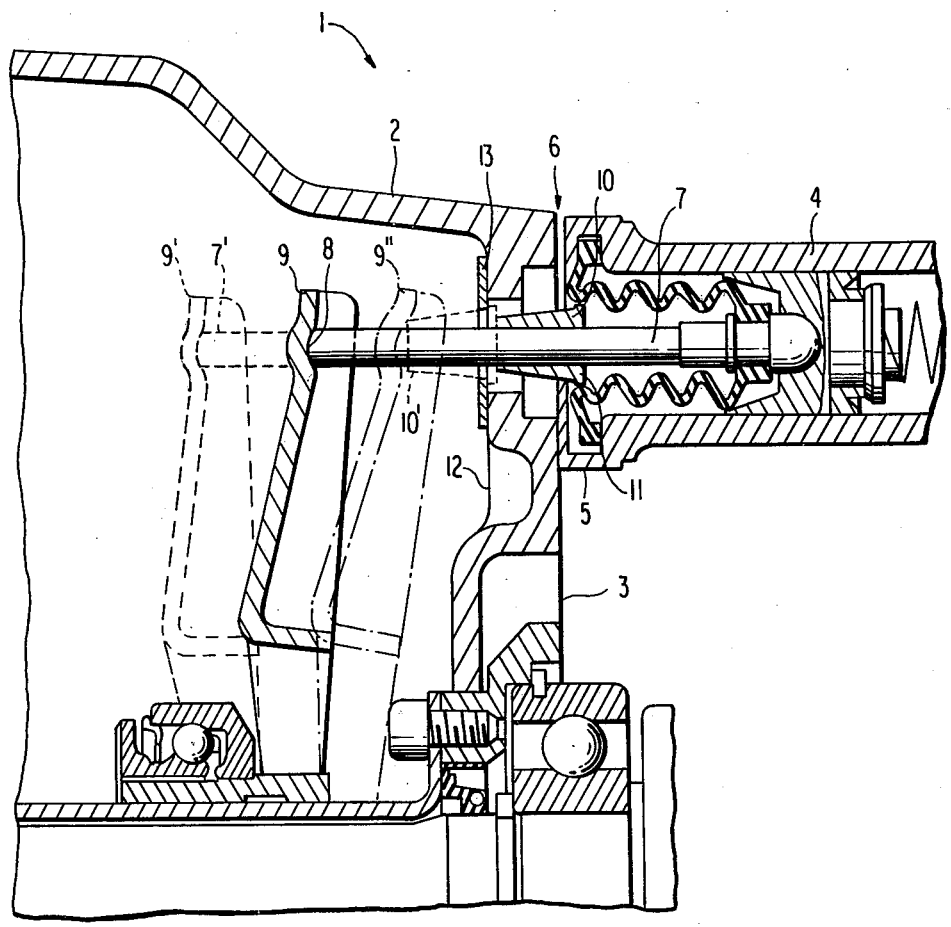
FIG. 1 is a cross sectional view of a clutch actuating device equipped with a clutch lining measurement device constructed in accordance with the present invention.

Referring now to the drawings wherein like reference numerals are used throughout the various views to designate like parts and, more particularly, to FIG. 1, according to this figure, a hydraulically actuated clutch generally designated by the reference numeral 1 includes a clutch housing 2 having an outer end wall 3, with a slave cylinder 4 of a schematically illustrated clutch actuating device being mounted to the outer end wall 3 by a flange portion 5. The flange portion 5 is provided with a recess generally designated by the reference numeral 6 at one end thereof such that a small gap or spacing is formed between the end wall 3 of the housing 2 and the cylinder 4.

The cylinder 4 includes an axially displaceable push rod 7 having an end thereof guided through an opening provided in the end wall 3 of the housing 2. The end of the push rod extending through the end wall 3 abutts a recess 8 of a throwout fork 9 disposed in the clutch housing 2. A tight fitting frustoconical sleeve 10 made of, for example, a plastic material, is provided on the push rod 7 in a vicinity of the recess 6. The frustoconical sleeve 10 is arranged on the push rod so that a small diameter portion of the frustoconical sleeve 10 faces the housing 2, with a larger diameter portion of the frustoconical sleeve 10 facing the cylinder 4. The large diameter portion of the frustoconical sleeve 10 is provided with a bead or flanged portion 11. A disc-shaped member 13, having an opening therein, is secured to or formed integrally with an inner surface 12 of the end wall 3, with the disc-shaped member 13 serving as a stop means for the bead 11 provided on the frustoconical sleeve 10. A space is provided between the disc-shaped member 13 and frustoconical sleeve 10 when the sleeve 10 is in the solid line position illustrated in FIG. 1. The push rod 7 is guided through the opening in the disc-shaped member 13. The opening in the disc-shaped member 13 has a diameter which is greater than a largest diameter of the sleeve 10 but less than a diameter of the bead 11 provided on the frustoconical sleeve 10.

Figure 2:
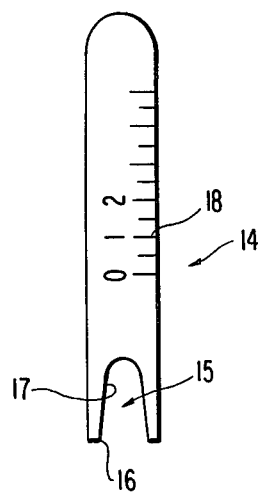
FIG. 2 is a planned view of a gauge of the present invention for determining wear of a clutch lining.

In order to determine a wear of the linings of the clutch 1, as shown in FIG. 2, a gauge generally designated by the reference numeral 14 is provided which is formed as a thin rectangular plate having a substantially U or V-shaped cutout portion generally designated by the reference numeral 15 on one end thereof. An outer contour 16 of the cutout 15 corresponds to a largest diameter portion of the frustoconical sleeve 10, with an inner contour 17 of the cutout 15 corresponding to the smallest diameter portion of the frustoconical sleeve 10. The gauge 14 has a thickness which is less than a width of the recess 6 so that the gauge may be inserted into the recess 6. A scale 18 is arranged in an area of the cutout 15.

As can be appreciated, in lieu of the scale 18, the gauge 14 may be provided with notches. Moreover, rather than providing the recess 6, the end wall of the clutch housing 2 may be provided with an appropriate opening (not shown) for enabling the gauge 14 to be inserted into the housing tube.

The clutch wear measuring device functions in the following manner:

When the clutch 1 is thrown out or disengaged for the first time using the actuating device, the throwout fork 9 is forced by push rod 7 into a throwout position 9' indicated in phantom line in FIG. 1 by an amount equal to a throwout distance of the clutch 1. The displacement of the push rod 7 by the actuating device results in the push rod being displaced to a throwout position 7'. Since the sleeve 10 is tightly fitted on the pushrod 7, the sleeve 10 moves along with the push rod 7. However, the frustoconical sleeve 10 can travel along with the push rod 7 only until the bead 11 of the frustoconical sleeve 10 strikes or comes into abutment with the disc-shaped member 13. The continued displacement of the push rod 7 by the clutch actuating device to the position 7' and the abutting of the bead 11 at the disc-shaped member 13 results in the frustoconical sleeve 10 assuming the position 10' indicated in phantom lines in FIG. 1, i.e., the frustoconical sleeve 10 is displaced on the push rod 7 and assumes a different position thereon.

When the clutch 1 is engaged, the throwout fork 9 returns from the position 9' to the original position illustrated in solid line in FIG. 1, whereby the frustoconical sleeve 10 is then disposed in a vicinity of the recess 6 or opening (not shown) provided in the clutch housing 2. After the gauge is inserted into the recess 6 or opening in the housing which serves as a measuring point, the position which frustoconical sleeve 10 then assumes may be marked as a starting point or zero position for the clutch 1 when the clutch is not subjected to any lining wear. The starting point 1 for the clutch 1 is marked as the zero position on the scale 18 of the gauge 14.

As the clutch lining wear increases, the throwout fork 9 forces the push rod 7 further and further into the cylinder 4 so that the frustoconical sleeve 10 with the rod 7 is displaced by the same amount out of the original starting position into the cylinder 4, whereby the diameter of the frustoconical sleeve 10 at the measurement point defined by the recess 6 or opening in the housing steadily decreases. When determining the smaller diameter portion, the gauge 14 may be pushed further into the recess 6, so that a difference between the zero or starting position of the clutch 1 without any lining wear and a worn position can be read on the scale 18 thereby providing accurate information as to the status of the degree of wear of the clutch 1.

When a throwout fork is in, for example, a position 9" indicated in phantom lines in FIG. 1, the clutch 1 no longer has sufficient clutch lining for the clutch 1 to function in a proper manner.

It is also possible to provide an appropriate electrical wear-indicating means for indicating the status of the linings of the clutch 1 by, for example, providing sensors for sensing a position of the conical sleeve 10. Similarly, the sleeve 10 may be provided with markings so as to enable a degree of wear of the clutch linings of the clutch 1 to be read directly if the push rod 7 is actuated directly in, for example, mechanically actuated clutches by, for example, a clutch pedal.

Additionally, the sleeve 10 may also have a stepped outer circumference rather than the conical shape or be provided with a longitudinally extending groove running diagonally of the sleeve 10, with the sleeve 10 then being adapted to be turned from the installation position through 180° relative to FIG. 1.

Depending upon the clutch construction, the stop formed by the disc-shaped member may be provided at any point between a measuring point and the throwout fork or be provided in the cylinder 4.

While we have shown or described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

I claim:

1. A device for measuring wear of clutch linings of a clutch having a throwout fork means and a displaceable push rod means adapted to act upon the throwout fork means, characterized in that means are provided for indicating a wear of the clutch linings including a sleeve means displaceably mounted on the rod means, stop means are provided in the clutch for displacing the sleeve means from a first position to a fixed second position corresponding to a maximum thickness of the clutch linings when the clutch is disengaged the first time, and in that means are provided in the clutch for defining a measuring area of the sleeve means, the measuring area being arranged at a position such that the sleeve means is disposed in the vicinity of the measuring area when the clutch is engaged.

2. A device according to claim 1, characterized in that the sleeve means is a generally frustoconical sleeve means disposed in a tight fitting manner on the push rod means.

3. A device according to claim 2, characterized in that a small diameter portion of the frustoconical sleeve means faces the throwout fork means.

4. A device according to claim 2, characterized in that the means for indicating further includes a gauge means for mesuring the frustoconical sleeve means, said means for defining a measuring area includes an opening provided in a housing of the clutch, said gauge means is adapted to be inserted into said opening.

5. A device according to claim 2, characterized in that the clutch further includes a clutch actuating cylinder means accommodating the push rod means, the cylinder means includes a flange means for enabling an attachment of the cylinder means to an end wall of a housing of the clutch, the means for defining a measuring area includes a gap formed between the flange means and end wall of the clutch housing, and in that the means for indicating a wear of the clutch linings further includes a gauge means for measuring the frustoconical sleeve means, said gauge means is adapted to be inserted into said gap.

6. A device according to one of claims 4 or 5, characterized in that the gauge means includes a substantially U-shaped opening provided on one end thereof, the U-shaped opening has an outer contour corresponding to a largest diameter portion of the frustoconical sleeve means and an inner contour corresponding to the small diameter portion of the frustoconical sleeve means, and in that means are provided on the gauge for indicating the wear of the clutch linings.

7. A device according to claim 6, characterized in that the stop means includes a disc-shaped member fixedly secured to a portion of the clutch, the disc-shaped member includes an opening therein for accommodating the push rod means, bead means formed on the frustoconical sleeve means having a diameter larger than the largest diameter of the frustoconical sleeve means, and that the opening in the disc-shaped member has a diameter less than the diameter of the bead means.

8. A device according to claim 1, characterized in that the sleeve means has a frustoconical outer circumference.

9. A device according to one of claims 1 or 2, characterized in that the stop means includes a disc-shaped member mounted on a portion of a clutch housing, the disc-shaped member having an opening therein for accommodating the push rod means, bead means formed on the sleeve means having a diameter larger than the largest diameter of the sleeve means, and that the opening in the disc-shaped member has a diameter less than the diameter of the bead means.

* * * * *